(12) United States Patent
Johnson et al.

(10) Patent No.: US 7,506,667 B1
(45) Date of Patent: Mar. 24, 2009

(54) FLEX STACK

(75) Inventors: Jeremy Johnson, Denton, TX (US);
Chengappalli P. Gopalakrishnan, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 12/038,709

(22) Filed: Feb. 27, 2008

(51) Int. Cl.
*F16L 11/00* (2006.01)

(52) U.S. Cl. ............... 138/118; 138/114; 138/121; 138/120; 60/322; 285/226; 285/299

(58) Field of Classification Search ............ 138/114, 138/118, 121, 120; 285/49, 226, 227, 229, 285/299, 300, 301; 60/322, 323
See application file for complete search history.

(56) References Cited

U.S. PATENT DOCUMENTS

| | | | |
|---|---|---|---|
| 247,591 A * | 9/1881 | White | 285/300 |
| 1,702,066 A * | 2/1929 | Valentine | 285/299 |
| 2,227,306 A | 12/1940 | Guy | 248/613 |
| 2,389,562 A | 11/1945 | Storch | 248/613 |
| 2,867,242 A | 1/1959 | Harris | 285/114 |
| 2,911,238 A * | 11/1959 | Myers et al. | 285/288.1 |
| 3,134,628 A | 5/1964 | Lackey | 298/21 R |
| 3,155,361 A | 11/1964 | Balan | 248/568 |
| 3,173,710 A | 3/1965 | Kinnison | 285/9.2 |
| 3,549,780 A * | 12/1970 | Graneau et al. | 174/21 R |
| 4,378,945 A | 4/1983 | Trautman | 277/608 |
| 4,531,619 A * | 7/1985 | Eckels | 188/371 |
| 4,575,128 A | 3/1986 | Sundquist | 285/9.2 |
| 4,907,666 A | 3/1990 | Tecco | 180/89.2 |
| 5,340,165 A * | 8/1994 | Sheppard | 285/226 |
| 5,437,479 A * | 8/1995 | Hartling et al. | 285/49 |
| 5,482,330 A * | 1/1996 | Holzhausen | 285/226 |
| 5,511,828 A * | 4/1996 | Kurek et al. | 285/49 |
| 5,649,685 A | 7/1997 | Keller | 248/638 |
| 5,873,429 A | 2/1999 | Qutub | 180/309 |
| 5,908,187 A | 6/1999 | Kalkoske | 248/635 |
| 5,988,308 A | 11/1999 | Qutub | 180/309 |
| 6,095,460 A | 8/2000 | Mercer | 248/59 |
| 6,109,661 A | 8/2000 | Cwik | 285/45 |
| 6,151,893 A | 11/2000 | Watanabe | 60/322 |
| 6,382,682 B1 * | 5/2002 | Taneda | 285/300 |

(Continued)

FOREIGN PATENT DOCUMENTS

JP      07-071249      3/1995

(Continued)

*Primary Examiner*—Patrick F Brinson
(74) *Attorney, Agent, or Firm*—Christensen O'Connor Johnson Kindness PLLC

(57) ABSTRACT

A flexible exhaust stack is suitable for use with a vehicle for which relative motion occurs between the cab of the vehicle and exhaust system components mounted to the vehicle frame. The exhaust stack includes a pipe mounted to the cab and having inlet and discharge ends. A collar is secured to an interior portion of the pipe between the inlet end and the discharge end. A flexible hose is at least partially disposed within the pipe, with a discharge end secured to the collar and an inlet end in fluid communication with the frame-mounted exhaust system components. The exhaust stack receives exhaust gases from the frame-mounted exhaust system components and discharges the exhaust gases from the discharge end of the pipe, while the flexible hose allows for relative motion between the cab and the exhaust system.

7 Claims, 4 Drawing Sheets

U.S. PATENT DOCUMENTS

| | | | |
|---|---|---|---|
| 6,488,313 B1 | 12/2002 | Thomas | 285/49 |
| 6,637,537 B2 | 10/2003 | Porter | 180/309 |
| 6,669,912 B1 | 12/2003 | Udell | 422/179 |
| 6,695,295 B2 | 2/2004 | Williams | 267/140.13 |
| 6,715,799 B2 | 4/2004 | Hardy | 285/223 |
| 6,758,300 B2 | 7/2004 | Kromis | 180/309 |
| 6,902,203 B2 | 6/2005 | Kang | 285/226 |
| 6,902,204 B2 | 6/2005 | Atanasoski | 285/226 |
| 6,916,049 B2 | 7/2005 | Hardy | 285/223 |
| 6,921,112 B2 | 7/2005 | Atansoski | 285/226 |
| 6,948,744 B2 | 9/2005 | Atansoski | 285/226 |
| 2003/0137147 A1 | 7/2003 | Girot | 285/47 |
| 2005/0253317 A1 | 11/2005 | Yasumoto | |

FOREIGN PATENT DOCUMENTS

| | | |
|---|---|---|
| JP | 08-319825 | 12/1996 |

* cited by examiner

FLEX STACK

BACKGROUND

Semi-trailer trucks typically include at least one vertical exhaust stack positioned rear of or alongside the truck cab. The vertical exhaust stack is normally secured to a side or rear surface of the truck cab. Other portions of the exhaust system, such as exhaust after-treatment devices, are often attached to the vehicle frame. Because the truck cab is moveably mounted to the frame of the vehicle, when the semi-trailer truck is in motion, there is necessarily relative movement between the exhaust stack and those exhaust system components that are mounted to the frame.

Some vehicles include an exhaust system support assembly that allows for a certain amount of relative motion between the exhaust stack and the vehicle cab. Thus, the exhaust stack is free to move with the frame-mounted exhaust system components free from the restriction that would result from rigidly mounting the exhaust stack to the vehicle cab. Nonetheless, these support assemblies often restrict the motion of the cab at the extreme positions of cab movement during jounce and rebound. This restriction can cause the exhaust system support assembly to be torn away from the truck cab when the truck cab moves beyond the limits to which the support assembly is designed to accommodate.

Other known exhaust systems include a section of flexible hose between the frame-mounted and cab-mounted portions of the exhaust system. The flexible hose provides a conduit from the frame-mounted portion to the cab-mounted portion, while allowing for relative motion therebetween. Still, such exhaust systems are not without disadvantages. For example, many vehicle operators take great pride in the appearance of their vehicles, often outfitting the vehicles with highly polished chrome exhaust system components. For these systems, a flexible hose, which can not be chromed and polished to match the other exhaust components, detracts from the overall appearance of the vehicle.

Operators of semi-trailer trucks would find desirable an exhaust system assembly that allows for relative motion between the cab-mounted exhaust stack and the frame-mounted exhaust components during jounce and rebound, while providing an aesthetically pleasing appearance.

SUMMARY

A disclosed flexible exhaust stack is suitable for use with a vehicle for which relative motion occurs between the cab of the vehicle and exhaust system components mounted to the vehicle frame. The exhaust stack includes a rigid pipe mounted to the cab and having inlet and discharge ends. The exhaust stack further includes an annular collar secured to an interior portion of the pipe between the inlet and discharge ends. A flexible hose is at least partially disposed within the rigid pipe, and has a discharge end secured to the collar to be in fluid communication with the discharge end of the rigid pipe. An inlet end of the hose is in fluid communication with the frame-mounted exhaust system components. The exhaust stack receives exhaust gases from the frame-mounted exhaust system components and discharges the exhaust gases from the discharge end of the rigid pipe, while the flexible hose allows for relative motion between the cab and the exhaust system.

A second embodiment of the disclosed flexible exhaust stack includes a rigid pipe that has inlet and discharge ends, and is mountable to the vehicle cab. The exhaust stack further includes an annular collar secured to an interior portion of the pipe between the inlet and discharge ends. A flexible hose is at least partially disposed within the rigid pipe, and has a discharge end secured to the collar so that the flexible hose is in fluid communication with the discharge end of the rigid pipe. An inlet end of the flexible hose is capable of receiving exhaust gases discharged from the exhaust system. The flexible hose allows for relative motion between the cab and the exhaust system.

A third embodiment of the disclosed flexible exhaust stack includes a rigid inlet pipe having an inlet end and a discharge end. A rigid discharge pipe has an inlet end attached to the discharge end of the inlet pipe to define a joint therebetween. An annular collar is disposed within the inlet pipe and/or the discharge pipe, and is secured to the joint. The exhaust stack further includes flexible hose at least partially disposed within the inlet pipe. A discharge end of the hose is secured to the collar so that the discharge end of the hose is in fluid communication with the discharge end of the discharge pipe. An inlet end of the hose is in fluid communication with the exhaust system. The exhaust stack receives exhaust gases from the exhaust system and discharges the exhaust gases from the discharge end of the discharge pipe, while the flexible hose allows for relative motion between the cab and the exhaust system.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Embodiments of the present invention will now be described with reference to the drawings where like numerals correspond to like elements. Embodiments of the disclosed subject matter and appended claims are generally directed to an exhaust system suitable for use with vehicles such as Class 8 trucks. More particularly, the disclosed subject matter and appended claims are directed to a flexible exhaust stack that allows for relative motion between the cab of the vehicle, to which the exhaust stack is mounted, and the vehicle frame, to which other exhaust system components are mounted.

Although exemplary embodiments of the present disclosure and appended claims will be described hereinafter with reference to Class 8 trucks, it will be appreciated that aspects of the claimed subject matter have wide application, and therefore, may be suitable for use with many types of vehicles that produce exhaust gases. Accordingly, the following descriptions and illustrations herein should be considered illustrative in nature, and thus, not limiting the scope of the present disclosure, as claimed.

In the following description, numerous specific details are set forth in order to provide a thorough understanding of exemplary embodiments of the disclosed and claimed subject matter. It will be apparent to one skilled in the art, however, that many embodiments of the claimed subject matter may be practiced without some or all of the specified details. Although a vehicle such as depicted in FIG. 1 represents one of the possible applications for the disclosed and claimed subject matter, it should be appreciated that aspects of the subject matter transcend any particular type of vehicle to include any vehicle having an exhaust system in which a flexible component of the exhaust system would be advantageous.

Figure 1:
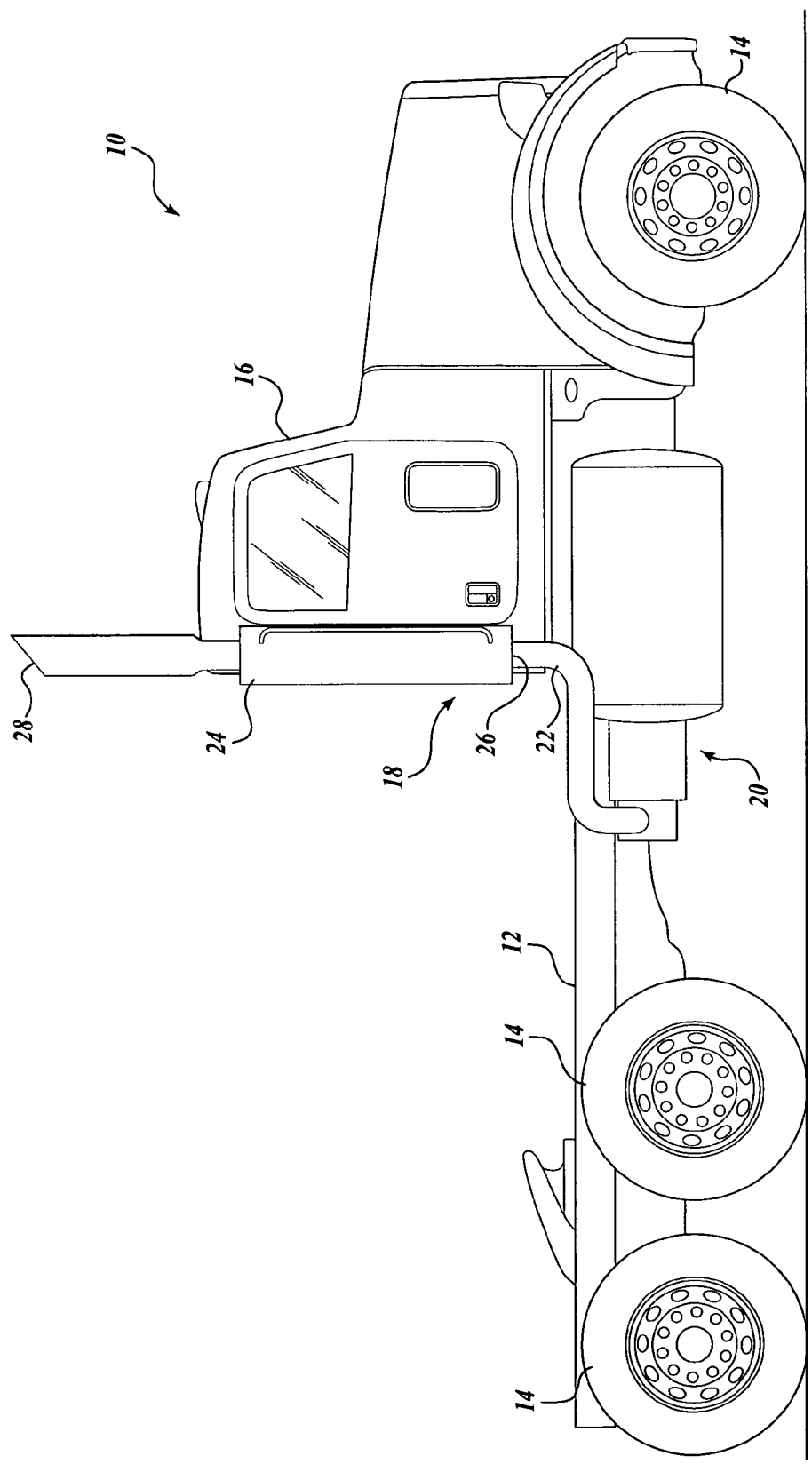
FIG. 1 is a side view of an exemplary embodiment of a disclosed flexible exhaust stack mounted to a vehicle according to the present disclosure.

As shown in FIG. 1, a vehicle 10, such as a Class 8 truck, includes a frame 12 supported by a plurality of wheels 14 rotatably mounted thereto. A cab 16 is moveable secured to the frame 12 by a suspension system to provide a sheltered enclosure from which an operator controls the vehicle 10. The suspension system provides a smoother ride for the vehicle operator by allowing relative motion between the cab 16 and the frame 12 so that the operator is isolated from some of the motion of the frame 12 during vehicle operation.

An internal combustion engine (not shown) is mounted to the frame 12 to drive the wheels 14 of the vehicle 10. During operation, the internal combustion engine produces exhaust gases, which are at least partially discharged to the environment through an exhaust system 18.

The exhaust system 18 includes a frame-mounted portion 20 in fluid communication with the engine to receive exhaust gases discharged from the engine. Various aftertreatment devices, such as mufflers and diesel particulate filters (DPF's), are optionally included in the frame-mounted portion 20 of the exhaust system 18. One or more rigid pipes form a discharge end 22 of the frame-mounted portion 20, through which exhaust gases from the engine are discharged.

The exhaust system 18 further includes a cab-mounted exhaust stack 24 with an inlet end 26 and a discharge end 28. The inlet end 26 of the exhaust stack 24 receives exhaust gases from the frame-mounted portion 20. The exhaust gases pass through the exhaust stack 24 and are discharged from the discharge end 28 into the atmosphere. Because the exhaust stack 24 is mounted to the cab 16, relative movement occurs between the exhaust stack an the frame-mounted portion 20 as the cab 16 moves relative to the frame 12 during vehicle operation.

Figure 2:
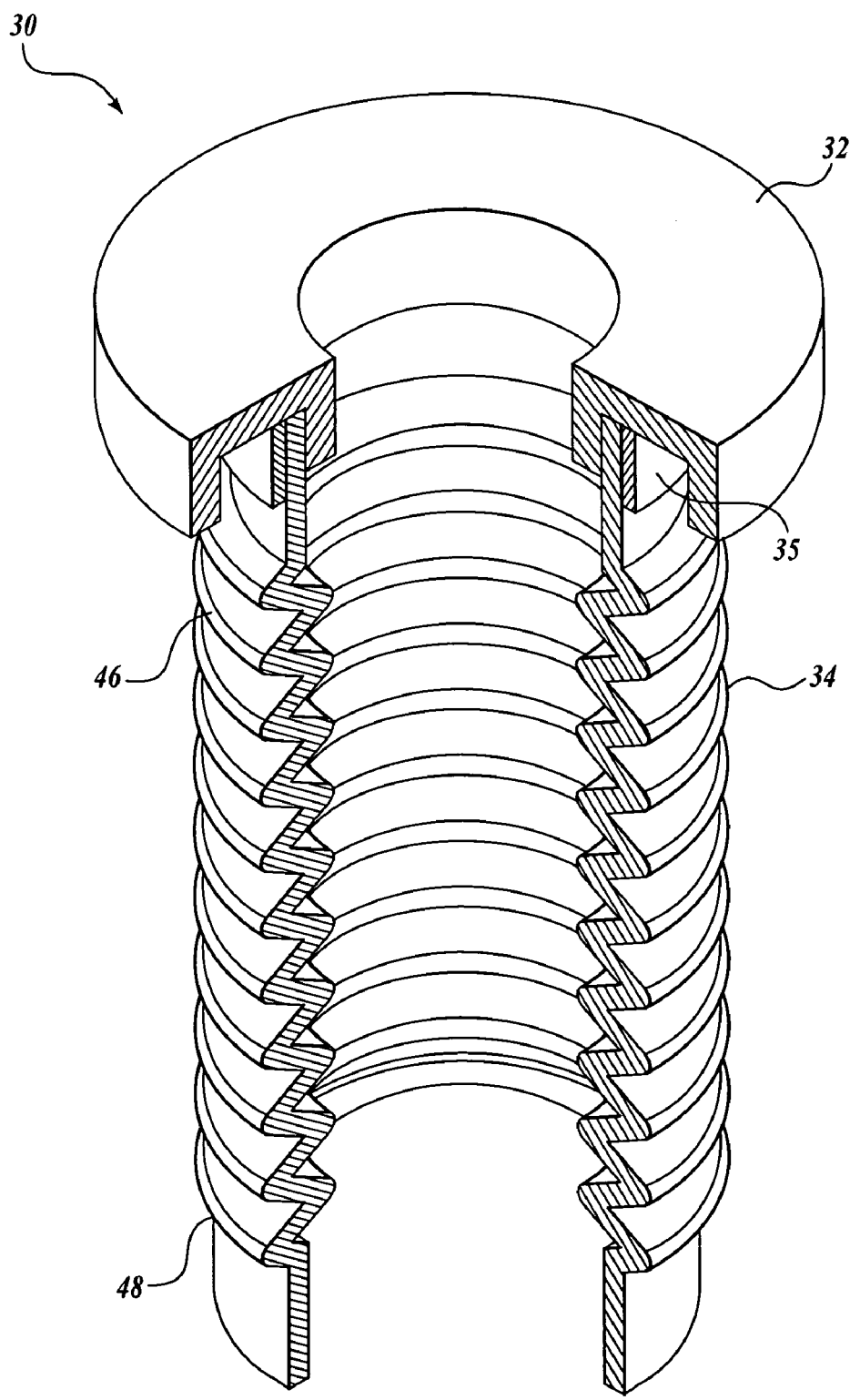
FIG. 2 is an isometric cutaway view of a flexible exhaust stack insert of the flexible exhaust stack shown in FIG. 1.

Referring to FIG. 2, the exhaust stack 24 includes a flexible insert 30 that provides a flexible connection between the frame-mounted portion 20 of the exhaust system 18 and the exhaust stack. The insert 30 includes an annular collar 32 and a flexible hose 34 having a discharge end 46 and an inlet end 48. A suitable flexible hose 34 is capable of stretching, compressing, and otherwise deflecting such that the hose does not unduly restrict the movement of the components to which it is coupled when relative motion occurs therebetween. Additionally, a suitable hose can accommodate relative motion that occurs between exhaust components during vehicle operation without damaging the components, the hose, or the structure to which they are mounted, and without causing leaks in the exhaust system.

The collar 32 is secured to the discharge end 46 of the flexible hose 34 by a band clamp 35, mechanical fasteners, high temperature adhesives, welding, or any other suitable method. In the disclosed embodiment, the collar 32 is formed of a heat resistant metal, such a stainless steel; but it should be appreciated that any material having suitable structural properties when subjected to hot exhaust gases may be used. Similarly, the flexible hose 34 is formed from a heat resistant metal, such as stainless steel; however, it should also be appreciated that any material having suitable structural properties at exhaust gas temperatures may also be used provided the material is capable of being formed into a flexible hose. The flexible hose may also be formed of a combination of materials to provide suitable attributes, such as strength, flexibility, and thermal resistance.

Figure 3:
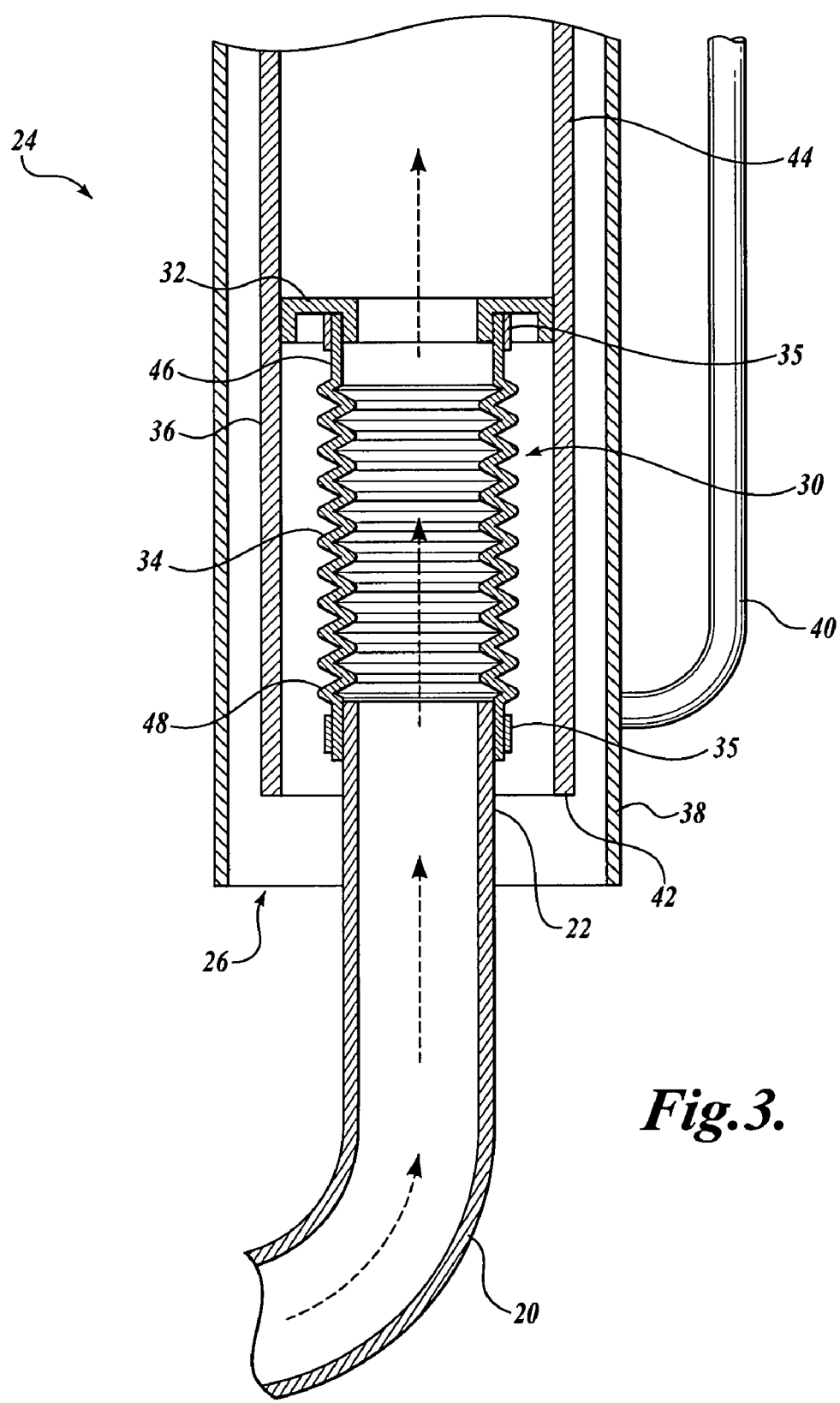
FIG. 3 is a partial cross-sectional view of the flexible exhaust stack shown in FIG. 1.

As shown in FIGS. 1 and 3, the exhaust stack 24 includes a generally straight portion of rigid pipe 36 having an inlet end 42 and a discharge end 44. The rigid pipe 36 is mounted to an exterior portion of the vehicle cab 16 in a substantially vertical position. Alternate embodiments wherein the shape and orientation of the rigid pipe vary are also contemplated and should be considered within the scope of the present disclosure and the appended claims. The illustrated embodiment also includes an optional heat shield 38 surrounding at least a portion of the pipe 36 to increase operator safety when in the area of the stack 24. In addition, the illustrated embodiment includes an access handle 40 attached to the rigid pipe 36 or the heat shield 38 to assist with ingress to and egress from the cab 16.

Referring now to FIG. 3, the flexible insert 30 is disposed within the rigid pipe 36 so that the flexible hose 34 extends toward the inlet end 26 of the exhaust stack 24. The insert 30 is secured to the rigid pipe 36 by welding the annular collar 32 of the insert 30 to the interior surface of the pipe 36. Alternately, the collar 32 may be secured to the pipe using high temperature adhesives, mechanical fasteners, interference fit, or any other suitable means.

The exhaust stack 24 is mounted to the vehicle cab 16, and the flexible hose 34 is secured to the discharge end 22 of the frame-mounted portion 20 of the exhaust system 18. When so mounted, the frame-mounted portion 20 and the exhaust stack 24 are in fluid communication so that exhaust gases discharged from the discharge end 22 of the frame-mounted portion 20 are received by the inlet end 26 of the exhaust stack 24 and discharged from the discharge end 28 of the exhaust stack 24 into the atmosphere. In the disclosed embodiment, the flexible hose 34 is removably secured to the discharge end 22 of the frame-mounted portion 20 with a clamp, such as a band clamp 35, however, it should be appreciated that welding, high temperature adhesives, mechanical fasteners, interference fit, any other suitable means for providing a fluid connection between the flexible hose 34 and the discharge end 28 of the frame-mounted portion 20 may be used.

As best shown in FIG. 3, the connection between the flexible hose 34 and the discharge end 22 of the frame-mounted portion 20 is positioned within the exhaust stack so that the entire flexible hose 34 is disposed within the rigid pipe 36. As a result, the flexible hose 34 is not visible when the exhaust stack 24 is viewed from the side of the vehicle 10. Thus, the disclosed exhaust stack 24 provides a flexible connection between the frame-mounted portion 20 of the exhaust system 18 and the cab-mounted exhaust stack 24, wherein all visible components, i.e., rigid pipes, heat shields, handles, etc., can have a common, aesthetically pleasing appearance, such as is provided by a chrome finish, while the flexible hose 34, which may be difficult to chrome, is hidden from view. It should be appreciated that embodiments in which finishes other than chrome are applied to the exhaust components would also enjoy an aesthetic benefit from obscuring the flexible hose 34 from view.

Figure 4:
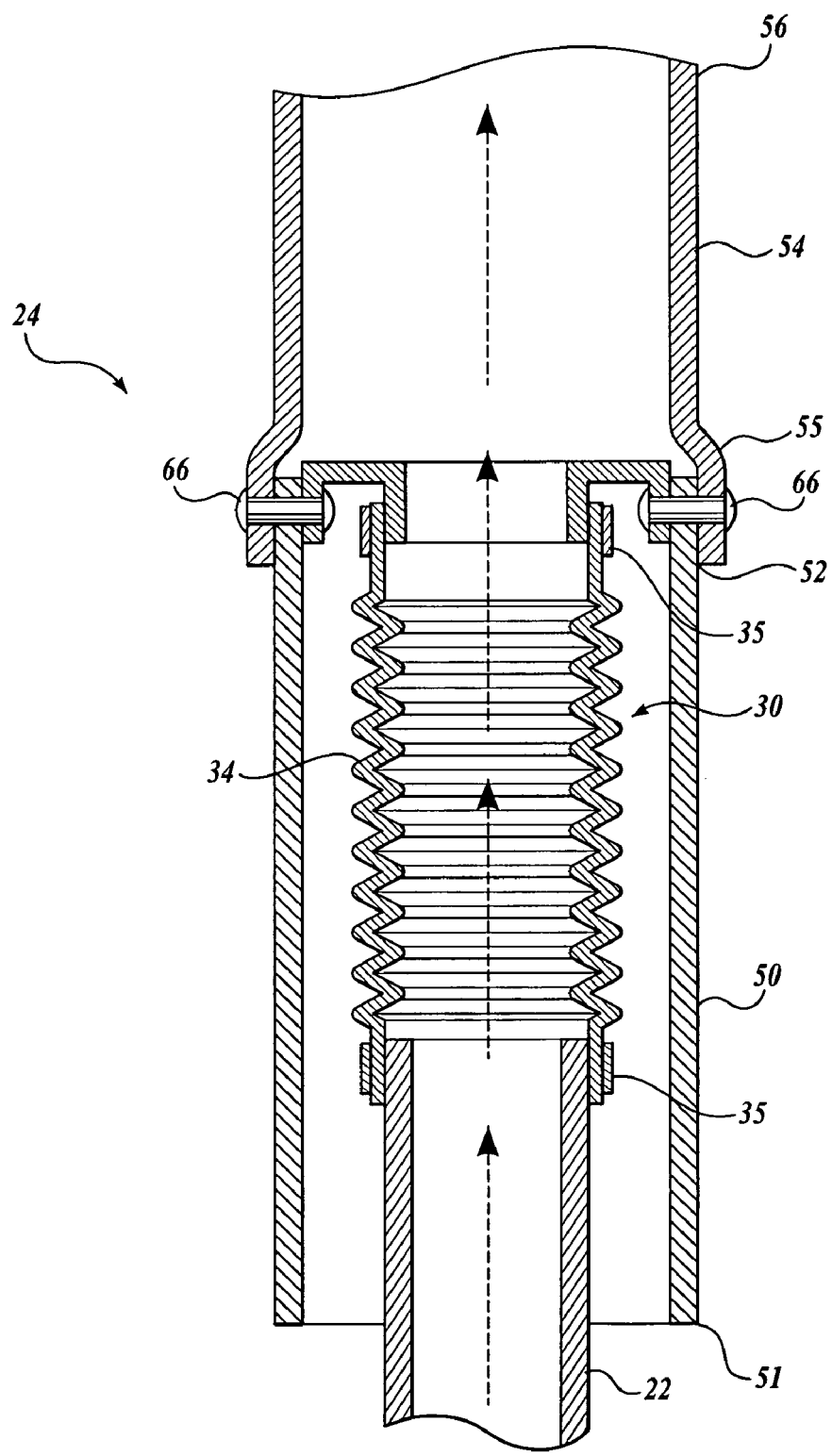
FIG. 4 is a partial cross-sectional view of a first alternate embodiment of the flexible exhaust stack shown in FIG. 1.

FIG. 4 shows an alternate embodiment of the disclosed exhaust stack 24 wherein the single rigid pipe 36 that surrounds the flexible insert 30 is replaced by an inlet pipe 50, which has an inlet end 51 and a discharge end 52, and a discharge pipe 54, which also has an inlet end 55 and a discharge end 56. The inlet end 55 of the discharge pipe 54 is flared and sized to receive the discharge end 52 of the inlet pipe 50. A plurality of mechanical fasteners 66 secure the inlet pipe 50 to the discharge pipe 54. The mechanical fasteners 66 also secure the collar 32 of the flexible insert 30 to the inlet pipe 50 and the discharge pipe 54 so that the flexible insert 30 is fixedly positioned within the exhaust stack 24 with the collar 32 located at the joint between the inlet pipe 50 and the discharge pipe 54.

While illustrative embodiments have been illustrated and described, it will be appreciated that various changes can be made therein without departing from the spirit and scope of the disclosure and the appended claims.

The embodiments of the invention in which an exclusive property or privilege is claimed are defined as follows:

1. A flexible exhaust stack for a vehicle having a cab movably mounted to a frame and exhaust system components fixedly mounted to the frame so that relative motion occurs between the cab and the frame-mounted exhaust system components, the flexible exhaust stack comprising:
    (a) a pipe having an inlet end and a discharge end, the pipe being mountable to the cab;
    (b) a collar secured to an interior portion of the pipe between the inlet end and the discharge end;
    (c) a flexible hose at least partially disposed within the pipe, a discharge end of the flexible hose being secured to the collar and disposed in fluid communication with the discharge end of the pipe, an inlet end of the flexible hose being capable of receiving exhaust gases discharged from the exhaust system, wherein the flexible hose allows for relative motion between the cab and the exhaust system; and
    (d) a heat shield at least partially surrounding the pipe.

2. A flexible exhaust stack for a vehicle having a cab movably mounted to a frame and exhaust system components fixedly mounted to the frame so that relative motion occurs between the cab and the frame-mounted exhaust system components, the flexible exhaust stack comprising:
    (a) a pipe having an inlet end and a discharge end, the pipe being mountable to the cab;
    (b) a collar secured to an interior portion of the pipe between the inlet end and the discharge end;
    (c) a flexible hose at least partially disposed within the pipe, a discharge end of the flexible hose being secured to the collar and disposed in fluid communication with the discharge end of the pipe, an inlet end of the flexible hose being capable of receiving exhaust gases discharged from the exhaust system, the flexible hose allowing for relative motion between the cab and the exhaust system, wherein the pipe is mounted to the cab, and the inlet end of the hose is disposed in fluid communication with the frame-mounted exhaust system components so that the exhaust stack receives exhaust gases from the frame-mounted exhaust system components and discharges the exhaust gases from the discharge end of the pipe.

3. The flexible exhaust stack of claim 2, wherein the flexible hose is entirely disposed within the pipe.

4. The flexible exhaust stack of claim 2, further comprising a heat shield surrounding the pipe.

5. A flexible exhaust stack for a vehicle having a cab movably mounted to a frame and an exhaust system components fixedly mounted to the frame so that relative motion occurs between the cab and the frame-mounted exhaust system components, the flexible exhaust stack comprising:
    (a) an inlet pipe having an inlet end and a discharge end;
    (b) a discharge pipe having an inlet end and a discharge end, the inlet end of the discharge pipe being attached to the discharge end of the inlet pipe to define a joint therebetween so that the inlet pipe is in fluid communication with the discharge pipe;
    (c) a collar disposed within at least one of the inlet pipe and the discharge pipe, the collar being secured to the at least one of the inlet pipe and the discharge pipe at the joint; and
    (d) a flexible hose at least partially disposed within the inlet pipe, a discharge end of the hose being secured to the collar so that the discharge end of the hose is in fluid communication with the discharge end of the discharge pipe, an inlet end of the hose being in fluid communication with the exhaust system so that the exhaust stack receives exhaust gases from the exhaust system and discharges the exhaust gases from the discharge end of the discharge pipe, wherein the flexible hose allows for relative motion between the cab and the exhaust system.

6. The flexible exhaust stack of claim 5, wherein the flexible hose is entirely disposed within the inlet pipe.

7. The flexible exhaust stack of claim 5, further comprising a heat shield at least partially surrounding at least one of the inlet pipe and the discharge pipe.

* * * * *